Patented Feb. 12, 1946

2,394,791

UNITED STATES PATENT OFFICE 2,394,791

BAKING BATTERS

Robert L. Lloyd, Laurelton, N. Y., and Ben F. Buchanan, Leonia, N. J., assignors to American Maize-Products Company, a corporation of Maine No Drawing. Application July 30, 1942, Serial No. 452,976

5 Claims. (Cl. 99—94)

This invention relates to batters for baking, the method of making the batters, and particularly to an admixture for improving the quality of the batters.

The invention is particularly useful in connection with the manufacture of bakery goods such as ice cream cones and waffles for sugar wafers. For this reason the invention will be illustrated by detailed description in connection with such products.

For best results in making the containing cones for ice cream and the waffles for sugar wafers, it has been necessary that the starch used should contain a large proportion of tapioca starch. There has been used a blend of flour, tapioca starch alone or a mixture of tapioca with other starch, sugar, water, usually a gas generating material, and minor proportions of other conventional ingredients. Batters so made are ordinarily maintained before use for a period of one to four hours at about 65° to 70° F. in a refrigerated holding tank. The batter is then pumped into baking irons and shaped into cones or wafers, each shaping requiring a period of about 4 to 10 seconds. The shaped article is subjected to baking which ordinarily continues for a period of from 1 to 5 minutes in an oven with direct heat applied to the baking irons as they pass through a baking atmosphere maintained at about 300° to 400° F.

Baking powders when used in such batters have not been satisfactory for a number of reasons, including premature generation of carbon dioxide during the period of mixing and holding of the batter, with the development of foam that must be removed by skimming and discarded, objectionable sticking in the shaping molds during baking, and unevenness of quality of the baked articles. Sodium bicarbonate alone to provide carbon dioxide gas has been used extensively as an improvement over baking powder in batters for the use described. With sodium bicarbonate substituted for the baking powder, various difficulties are encountered among which are premature carbon dioxide generation caused by reaction with acid ingredients giving excessive foam in the holding tank and also delayed generation of the remaining carbon dioxide on decomposition of the bicarbonate during the baking operation.

The present invention provides a composition in which the relatively expensive tapioca starch or flour may be replaced entirely by a less expensive short gel starch of which acid free corn starch is an example and which gives improved results. Batters made according to the invention show less sticking of the batter to the shaping molds, fewer "cripples" among the baked pieces, and more uniform color and quality of the baked pieces than when conventional compositions with tapioca starch are used.

The invention comprises an admixture for baking batters including starch that has been preneutralized by the addition of an alkaline substance, so as to establish the pH at a value not substantially below 6.8, lactide and calcium carbonate, the calcium carbonate being in excess of the amount required to neutralize the lactide so that the excess of calcium carbonate is available during the baking period for neutralizing acidity of the flour, sugar, and any other batter ingredient normally on the acid side of pH 7. In the preferred embodiment the invention comprises the use in such an admixture of a short gel starch. The invention comprises also batters made with such an admixture and the method of making the admixture and batter, particularly for the manufacture of ice cream cones and waffles for sugar wafers.

In general there is formed a mixture of the selected starch in preneutralized condition, lactide, and calcium carbonate. This mixture is substituted for tapioca starch, part of the sodium bicarbonate, and baking powder, if any, in a conventional batter for the uses described. If desired, the several ingredients of the admixture may be introduced separately into the batter, the batter including a large proportion of flour, the necessary sucrose or sweetening agent such as dextrose, invert sugar, or starch conversion syrup solids and sufficient water to give the consistency desired. Other ingredients such as salt, coloring material, and the like that are commonly used in making such batters may also be present in usual proportions. Commercially, the batter so made is refrigerated as described until molds are available for receiving it. The batter is then supplied to and shaped in the molds and baked in usual manner.

For most purposes and particularly for ice cream cones, a small proportion of sodium bicarbonate is incorporated into our batter, to provide for generation of gas during later stages of the baking operation. The sodium bicarbonate, if used, is present in proportion that is suitably not substantially above and preferably less than the proportion of calcium carbonate used.

There is thus produced a batter in which there is minimized generation of carbon dioxide during mixing of the batter and holding previous to charging into the heated molds but that, when charged to the heated molds, gives a very quick generation of carbon dioxide, the generation being practically complete within the six seconds or so during which the batter is being formed into a shape retaining article. With such a batter, there is thus produced a finished baked product of better, more uniform color that is less susceptible to variation due to lack of control of baking conditions than is realized when the composition includes the relatively expensive tapioca starch instead of the special admixture of the present invention. Furthermore, the cones or waffles for sugar wafers so made show decreased breakage during manufacture as well as in handling and use.

The starch selected for the present invention is preferably one of the common short gel starches, by which is meant starch from corn, potato, rice, barley, or the like. The starch must be pre-neutralized before incorporation into any mixture including the lactide and the calcium carbonate, the neutralization being effected by the use of an alkaline substance to establish the pH at a value not substantially below 6.8 and suitably within the range 6.8 to 7.5, the range which has been used to best advantage commercially being 7 to 7.3. The neutralization makes the starch heavier bodied when in a hot paste and of longer gel properties when the paste is set. The use of such starch promotes holding up of the cone or wafer structure during baking and the desired crispness but durability of the baked article. The use of such pre-neutralized starch avoids too rapid development of color and underbaking of the cone or waffle when the browning has been carried to the proper degree and avoids also premature gas generation and excessive foaming of the batter due to acidity of the starch, these difficulties being encountered in the use of the starch in unneutralized condition.

Since tapioca starch is somewhat difficult to neutralize, its use is not particularly desirable even if the starch were available at the same price as less expensive starches. Tapioca, however, may be used alone or mixed with one of the other starches, although it is not so conveniently neutralized as the short gel starches.

The selected starch is first neutralized, as with a soluble alkaline substance such as a solution of sodium carbonate, sodium bicarbonate, or potassium bicarbonate added in the form of a very dilute solution and in proportion to establish the pH within the range stated. Also, the starch may be preneutralized by vapors rising from an aqueous solution of ammonium hydroxide of concentration, say, 25%, and at a temperature of 25° C., the time of exposure of the starch to the vapor being ordinarily about 2 hours and the starch being maintained in a thin layer just above the solution during this exposure. In any case the treated starch is dried and is pulverized before use if pulverization is necessary to reduce the preneutralized starch to a finely divided state.

The lactide used is an edible grade and is preferably finely divided.

The calcium carbonate used is finely divided and substantially free from such impurities as would introduce objectionable color, abnormally high density, or toxicity. Thus the calcium carbonate used should contain very little if any iron and should be free from toxic amounts of compounds of fluorine, arsenic, lead and the like.

The calcium carbonate used is either the impalpable precipitated variety or finely ground, relatively pure amorphous calcium carbonate, say of fineness to pass substantially completely through a 100-mesh screen and preferably through a 200-mesh screen. Fineness of subdivision of the calcium carbonate serves to prevent settling of calcium carbonate from the batter and to give quick generation of gas when the mixture including the calcium carbonate and lactide is warmed in the shaping of the batter. Calcium carbonate in which the particles are predominantly of size 2 to 5 microns has been used with very satisfactory results.

Instead of the calcium carbonate, there may be used another water insoluble, unobjectionably colored, non-toxic metal carbonate that is substantially non-reactive with lactide in the cold but rapidly reactive hot and that when used in excess of the lactide and in conjunction with neutralized starch improves the baking properties of the batter as does the calcium carbonate. We do not know at this time of any carbonate other than calcium carbonate that meets these requirements and is available commercially at a satisfactory price.

In making the batter there is used wheat, rye, or like cereal flour and preferably wheat flour in proportion larger than that of any other solid ingredient of the batter.

The total weight of lactide and calcium carbonate is ordinarily about 1 to 10 parts for 100 parts of the starch, and advantageously approximately 2 to 7 parts. Furthermore, the proportion of lactide is substantially less than that equivalent theoretically to the calcium carbonate, the equivalent weights for the two materials being 72 and 50, respectively. Preferably we use 1 part of lactide to about 4 to 16 parts of calcium carbonate.

Examples of suitable proportions of the admixture for use with flour, water and other ingredients in making the batter for baking are shown in the following table.

| Ingredient | Parts by weight | |
|---|---|---|
|  | Suitable range | Preferred range |
| Starch | 100 | 100 |
| Calcium carbonate | 1–10 | 2–5 |
| Lactide | 0.15–10 | 0.25–5 |

It will be noted that the proportions are not critical except for the excess of the carbonate referred to above and the use of the starch in proportion much larger than the total of the carbonate and lactide.

The effect of the excess calcium carbonate in conjunction with the neutralized starch in improving the baking qualities of the batter is pronounced, particularly in giving better color and more uniform quality of the baked goods.

This effect is considered to be due partly to the slow neutralization of acidity of various normally slightly acidic ingredients of the batter and to coaction with the neutralized starch and amino acids of proteins used, as in the flour.

The following is a specific example of the practice of the invention in making molded cones for ice cream or the thin waffle shaped articles used with a cream filler in making sugar wafers. To 100 pounds of wheat flour there are added 24 pounds of sugar, 1 pound of caramel coloring material, ¼ pound of salt, 6 pounds of the special admixture, and 10 gallons of water. Since the special admixture is shown in the table above to include, in one selection of proportions, 1 to 10 parts of calcium carbonate for a total of 101.15 to 120 parts of total weight, the percentage of calcium carbonate on this basis ranges from approximately 1 to 8. When six pounds of this admixture is used in a batter having a total dry weight of 131.25 pounds, the composition includes calcium carbonate in the proportion of 0.06 divided by 131.25 or 0.046% to 0.50 divided by 131.25 or 0.38%. In a typical batter, the special admixture includes preneutralized starch, lactide, and calcium carbonate of 200 mesh or finer, in the following proportions:

Starch (corn) _____ pounds __ 100
Lactide _____ ounces __ 2.3
Calcium carbonate _____ pounds __ 2.4

The preferred order of mixing includes adding all of the dry ingredients to 7.5 gallons of water in the mixer, mixing the whole to a smooth consistency, and subsequently adding the balance of the water when the mixer is running until the desired consistency has been obtained.

The batter so made is poured into holding tanks from which it is distributed when required to a series of molds in the oven, the molding machine and baking technique being conventional. Baking is then effected in the heated oven in usual manner.

The product so made is uniform in color and crispness. In the case of the ice cream cones, it is free from objectionable variation between the color of the baked dough at the upper flaring edge of the cone and the lower part of the cone, variation between the color of these two parts of the cones being quite common and causing rejections in cones made from conventional compositions. Also, the cones and wafers made as described in this example and elsewhere herein are durable and resistant to breakage during handling and in use.

The same procedure is followed in making waffles for sugar wafers as in making ice cream cones, except for proportion of ingredients, the shape of the molds used and details of manipulation, all of which are those that are usual in making the two products. In making ice cream cones approximately 1 to 5 parts, say 3.5 parts, of sodium bicarbonate are preferably added to the batter or to the solid materials going into the batter for each 4.5 parts of calcium carbonate used.

It will be understood that it is intended to cover all changes and modifications of the example of the invention herein chosen for the purpose of illustration which do not constitute departures from the spirit and scope of the invention.

What we claim is:

1. A batter mixture for baking comprising an intimate mixture of neutral starch of pH not substantially below 6.8, lactide, and calcium carbonate, all in finely divided condition, the calcium carbonate being present in the proportion of about 0.046 to 0.38 part for 100 parts dry weight of the batter mixture and 4 to 16 parts to 1 of the lactide, the neutral starch being substantially unreactive with the calcium carbonate, and the excess of calcium carbonate over the amount chemically equivalent to the lactide serving to improve the quality of the batter.

2. A batter mixture as described in claim 1, the lactide and calcium carbonate each being present in proportion substantially smaller than the proportion of the starch.

3. An ice cream cone batter comprising the composition described in claim 1, sweetener, sodium bicarbonate, and water, the sodium bicarbonate serving to generate carbon dioxide during the later stages of baking of the batter and to increase the pH of the finished cone.

4. A batter as described in claim 1 including sodium carbonate in amount not substantially in excess of the amount of calcium carbonate, the pH of the starch being within the range 6.8 to 7.5.

5. A baking batter comprising flour, sweetener, substantially neutral corn starch, lactide, finely divided calcium carbonate, and water, the flour being present in larger proportion than any other solid material, the calcium carbonate being present in the proportion of 0.046 to 0.38 part for 100 parts dry weight of the batter and 4 to 16 parts for 1 part of the lactide, and the total weight of lactide and calcium carbonate being 1 to 10 parts for 100 parts of the corn starch.

ROBERT L. LLOYD.
BEN F. BUCHANAN.